US008218180B2

(12) United States Patent
Shobu

(10) Patent No.: US 8,218,180 B2
(45) Date of Patent: Jul. 10, 2012

(54) IMAGE FORMING APPARATUS AND METHOD FOR INHIBITING THE TRANSMISSION OF DOCUMENT DATA

(75) Inventor: Toshifumi Shobu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 881 days.

(21) Appl. No.: 12/331,495

(22) Filed: Dec. 10, 2008

(65) Prior Publication Data

US 2009/0161141 A1 Jun. 25, 2009

(30) Foreign Application Priority Data

Dec. 20, 2007 (JP) ................................ 2007-329389
Nov. 10, 2008 (JP) ................................ 2008-287957

(51) Int. Cl.
*G06K 15/00* (2006.01)
*G06K 3/12* (2006.01)
*H04N 1/40* (2006.01)
*H04N 1/46* (2006.01)
*G11C 7/00* (2006.01)
*B41J 2/01* (2006.01)

(52) U.S. Cl. ...................... 358/1.15; 358/1.14; 358/3.28; 358/508; 365/198; 365/195; 347/107

(58) Field of Classification Search ................. 358/1.14, 358/1.15, 501, 505, 508, 539, 401, 448, 470, 358/474, 476, 405; 365/198, 196; D18/15; 347/107

See application file for complete search history.

(56) References Cited

U.S. PATENT DOCUMENTS 5,987,127 A 11/1999 Ikenoue et al.
2003/0179412 A1* 9/2003 Matsunoshita ............... 358/3.28
2005/0122357 A1* 6/2005 Sakuraba et al. ................ 347/14
2006/0187495 A1* 8/2006 Ueda et al. ..................... 358/400
2006/0197972 A1* 9/2006 Hayashi ........................ 358/1.14
2007/0146806 A1* 6/2007 Ishihara ........................ 358/405

FOREIGN PATENT DOCUMENTS

| JP | 61-285578 | 12/1986 |
| JP | 2005-150858 | 6/2005 |
| JP | 2006-289680 | 10/2006 |
| WO | WO 2007/142415 | 12/2007 |

OTHER PUBLICATIONS

Daishi, Facsimile Machine, Sep. 6, 2005, Machine Translation Japanese Patent Application Publication, JP 2005150858, all pages.* Communication.
Extended European Search Report.

* cited by examiner

*Primary Examiner* — Benny Q Tieu
*Assistant Examiner* — Ngon Nguyen
(74) *Attorney, Agent, or Firm* — IPUSA, PLLC

(57) ABSTRACT

An image forming apparatus includes an image receiving unit configured to receive image data, a sender identifying unit configured to identify a sender of the received image data, a check unit configured to check whether the identified sender corresponds to a predetermined sender, a management information providing unit configured to provide management-purpose image data obtained by encoding management information for controlling at least one of a transmission operation for transmitting an image scanned from a printout and a copy operation for copying an image scanned from a printout, and a print unit configured to print the management-purpose image data together with the received image data in response to a check result by the check unit indicating that the identified sender corresponds to the predetermined sender.

14 Claims, 12 Drawing Sheets

FIG.11

| | NAME | SENDER (RECEIVED FROM) | BACKGROUND PATTERN | FLAG |
|---|---|---|---|---|
| 1 | COMPANY A | 03-XXXX-XXXX | COPY PROHIBITION | ON |
| 2 | COMPANY B | 05-XXX-XXXX | STAMP MARKING | OFF |
| 3 | COMPANY C | 045-XXX-XXXX | OFF | |
| 4 | INDIVIDUAL A | XXX@mail.cc | USER INFORMATION MAKING | |
| 5 | INDIVIDUAL B | 101.XXX.XXX.XXX | TRANSMISSION AND COPY INHIBITION | OFF |

61

IMAGE FORMING APPARATUS AND METHOD FOR INHIBITING THE TRANSMISSION OF DOCUMENT DATA

BACKGROUND OF THE INVENTION

1. Field of the Invention

The disclosures herein generally relate to an image forming apparatus, an image forming method, and a computer-readable recording medium having a program recorded therein for inhibiting the transmission (or transfer) of document data scanned by a scanner or the like.

2. Description of the Related Art

In recent years, electrophotography-based printers have been widely used. The use of such printers makes it possible to easily make document copies. Especially, color multifunction peripherals can produce an extremely accurate copy that is hard to distinguish from the original. It thus becomes important to prevent forgery or illegal copying of sensitive documents.

In order to prevent forgery or the like of sensitive documents, various measures are put in place.

For example, Japanese Patent Application Publication No. 2006-121430 discloses an image processing apparatus provided with a background-pattern printing function that prints an inconspicuous pattern (e.g., letters such as "No Copying") in the background on which an image of an original sensitive document is printed, so that this background pattern will conspicuously appear upon making a copy. Japanese Patent Application Publication No. 2000-184178 discloses an image forming apparatus that prints a barcode containing the information indicative of "no copy allowed" on part of an original document, so that the copying of this document is prevented when detecting this "no copy" indication upon scanning the original document containing the barcode.

The demand for security is on the increase not only with respect to data on paper media but also with respect to electronic data.

In order to meet such a demand, Japanese Patent Application Publication No. 2005-38371 describes a security policy for use in corporations, which prevents electronic data from being illegally accessed by restricting access to documents to be transmitted.

When the contents of sensitive electronic data need to be shared with a certain number of people, it may be more convenient and efficient to distribute printouts of this electronic data rather than to let the people see the contents on the display screen of a personal computer or the like.

In such a case, conventionally, a user needs to explicitly make such a print setting that a background pattern or barcode is printed on a printed sheet in addition to the contents of the document to prevent copying or the like. Such a print setting is made through manual operations. It is thus difficult to make sure that all the users make such print setting without exception. There may be a case in which the document is printed with neither a background pattern nor a barcode. In such a case, people who have received the printouts may copy the document or transmit (transfer) the document by use of fax, resulting in a situation in which the copies of the document is in the hands of an unspecified number of people. This may create a risk of information leakage.

Accordingly, it is desirable to provide a mechanism which can prevent the leakage of information by automatically adding a background pattern or barcode without user intervention when printing electronic data containing confidential contents.

SUMMARY OF THE INVENTION

It is a general object of at least one embodiment of the present invention to provide a scheme for forming an image that substantially eliminates one or more problems caused by the limitations and disadvantages of the related art.

In one embodiment, an image forming apparatus includes an image receiving unit configured to receive image data, a sender identifying unit configured to identify a sender of the received image data, a check unit configured to check whether the identified sender corresponds to a predetermined sender, a management information providing unit configured to provide management-purpose image data obtained by encoding management information for controlling at least one of a transmission operation for transmitting an image scanned from a printout and a copy operation for copying an image scanned from a printout, and a print unit configured to print the management-purpose image data together with the received image data in response to a check result by the check unit indicating that the identified sender corresponds to the predetermined sender.

In another embodiment an image forming method includes the steps of receiving image data, identifying a sender of the received image data, checking whether the identified sender corresponds to a predetermined sender, providing management-purpose image data obtained by encoding management information for controlling at least one of a transmission operation for transmitting an image scanned from a printout and a copy operation for copying an image scanned from a printout, and printing the management-purpose image data together with the received image data in response to a check result by the check unit indicating that the identified sender corresponds to the predetermined sender.

In another embodiment, a computer-readable record medium has a program embodied therein for causing a computer to perform the steps of receiving image data, identifying a sender of the received image data, checking whether the identified sender corresponds to a predetermined sender, providing management-purpose image data obtained by encoding management information for controlling at least one of a transmission operation for transmitting an image scanned from a printout and a copy operation for copying an image scanned from a printout, and printing the management-purpose image data together with the received image data in response to a check result by the check unit indicating that the identified sender corresponds to the predetermined sender.

According to at least one embodiment of the present invention, a background pattern or barcode can be attached automatically without user intervention to electronic data that is regarded as confidential. This arrangement can save a user time and effort, and reliably inhibits the transmission of electronic data printed on a printout, thereby preventing the leakage of information.

BRIEF DESCRIPTION OF THE DRAWINGS

Other objects and further features of embodiments will be apparent from the following detailed description when read in conjunction with the accompanying drawings, in which:

FIG. 11 is a drawing showing an example of an address table used in a check operation for checking whether a sender corresponds to a particular address;

DESCRIPTION OF THE PREFERRED EMBODIMENTS

In the following, a multifunction peripheral that is an embodiment of an image forming apparatus of the present invention will be described with reference to the accompanying drawings.

Figure 1:
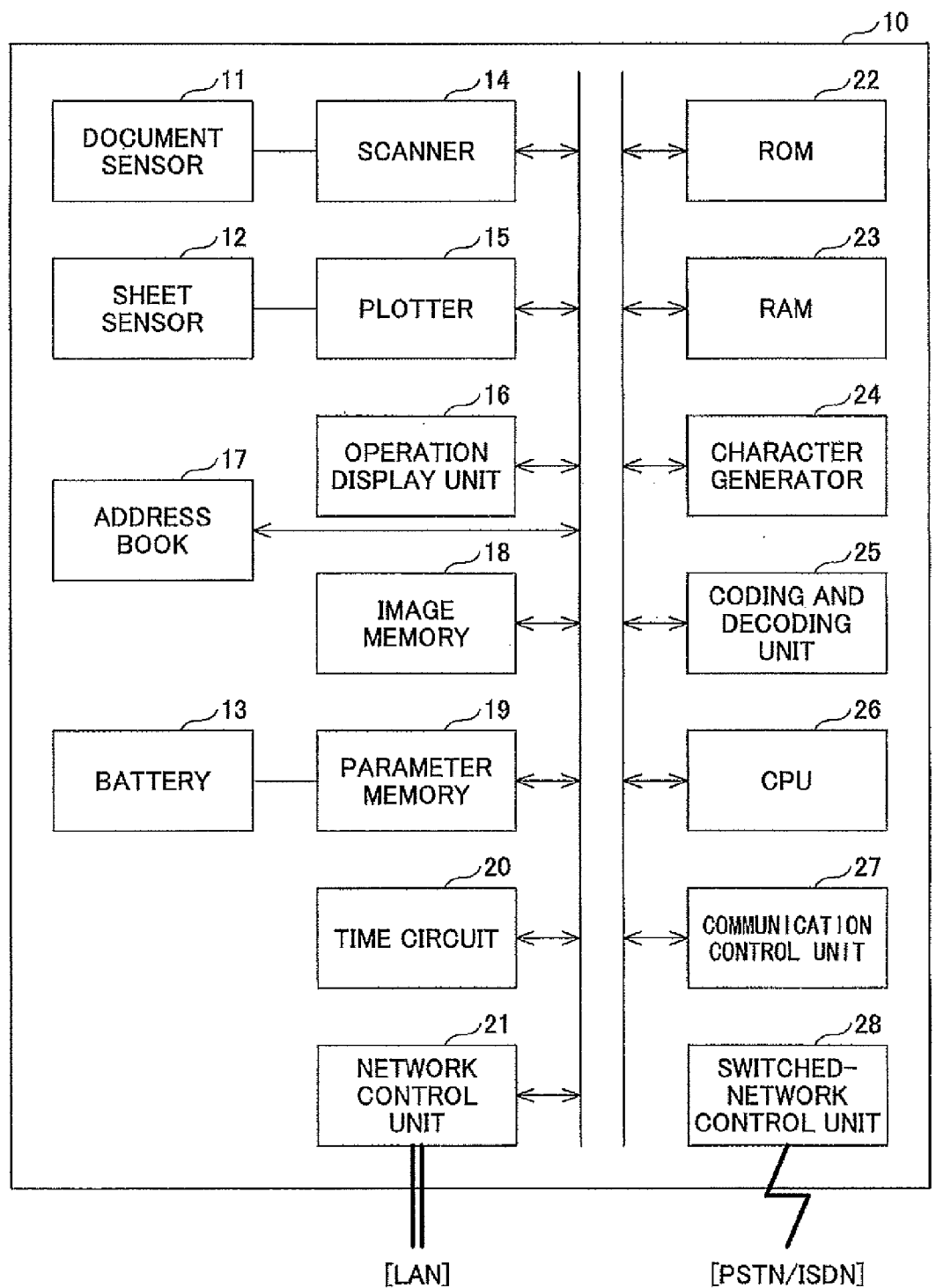
FIG. 1 is a functional block diagram of a multifunction peripheral.

FIG. 1 is a functional block diagram of a multifunction peripheral according to the present embodiment.

A multifunction peripheral 10 includes a document sensor 11 for detecting the presence/absence of a document, a scanner 14 for scanning a document detected by the document sensor 11, a sheet sensor 12 for detecting the presence/absence of a sheet serving as a printing medium, a plotter 15 for printing on a sheet detected by the sheet sensor 12, an operation display unit 16 for displaying information relevant to user operations, an address book 17 for storing electronic mail addresses, an image memory 18 for storing image data, a parameter memory 19 for storing parameters used for communication, a time circuit 20 for measuring time, a network control unit 21 for receiving print requests and print data or the like from a network and for transmitting and receiving electronic mail, a ROM (Read Only Memory) 22 serving as a read-only data storage, a RAM (Random Access Memory) 23 serving as a volatile data storage, a character generator 24 for generating character data, a coding and decoding unit 25 for coding and decoding image information, a CPU (Central Processing Unit) 26 for executing programs stored in the ROM 22, a communication control unit 27 for transmitting and receiving control signals for facsimile transmission or the like, and a switched-network control unit 28 for detecting incoming calls and generating outgoing calls with respect to the telephone network (i.e., public line).

The document sensor 11 detects a document when the document is set in a document placement platform. Upon such a detection, the document is fed to the position where the scanner 14 scans the document.

The scanner 14 optically scans the image of the document, line by line, to produce image data. A scan unit of the scanner 14 is comprised of a line image sensor utilizing a CCD (Charged Coupled Device) or the like. Upon scanning an image, added information such as a background or barcode is detected. In the case of a barcode, an area at a predetermined position on a document sheet may be set aside for use as a barcode area. The contents of barcode information may be decoded by analyzing image data obtained from such a predetermined position of the image scanned by the scanner. In the case of a background pattern, a check may be made as to whether the image data obtained by the scanner contains a background pattern. Upon a check result indicative of the presence of a background pattern, the background pattern is analyzed to decode its information contents. Such check, analysis, and decode processes may be performed by the CPU 26. The information contents decoded from a barcode or background pattern constitute management information with respect to the scanned image, such management information indicating the presence/absence of copy inhibition, the presence/absence of transmission inhibition, the presence/absence of a "stamp mark" requirement for copy printing, the presence/absence of a "user information mark" requirement for copy printing, etc. In response to the indications provided in the management information, the multifunction peripheral 10 controls a print operation and a transmission operation with respect to the scanned image.

The sheet sensor 12 detects whether a print sheet is stored in a sheet feeder cassette (not shown). The print sheet is fed (carried) from the sheet feeder cassette to the plotter 15 in synchronization with the scan timing of the scanner 14.

The scanner 14 produces a printed image by use of an electrophotography method, which includes steps such as charging, tracing, exposure, development, charge removal, transfer, separation, and cleaning. Namely, a photoconductive body charged by a charge unit (not shown) is exposed to light corresponding to image data (plot data) to create an electrostatic latent image. A development unit (not shown) applies voltage to the electrostatic latent image on the photoconductive body so that toner is attached to represent desired image tones. The toner image is then transferred to a print sheet when a transfer unit (not shown) performs corona discharge on the backside of the print sheet that is carried through a sheet supply path to come in close contact with the photoconductive body. If a predetermined condition is satisfied with respect to a document source from which the document to be printed has been supplied, a background pattern or barcode that represents predetermined management information in decoded form is printed together with the image of the document. This predetermined condition regarding a document source will later be described in detail.

In the case of a barcode, a one-dimensional barcode or a two-dimensional barcode may be printed in an area situated at a predetermined position on a print sheet that is set aside as a barcode area. In the case of a background pattern, dot patterns may be assigned in advance to bit values "0" and "1", respectively. For example, a plurality of dot patterns can be made by setting a predetermined number of pixels to black in a 3-×-3 pixel matrix including a total of 9 pixels and setting the remaining pixels to white. Among such a plurality of dot patterns, a certain dot pattern is selected to represent "0" and another dot pattern is selected to represent "1". At the time of printing, management information that is to be embedded is converted into a bit sequence comprised of "0"s and "1"s. A sequence of dot patterns corresponding to this obtained bit sequence is then printed together with the image data that was originally supposed to be printed.

The operation display unit 16 supplies information entered by a user using a key pad on the operation panel unit (not shown) to the CPU 26, and displays the entered information and the state of the multifunction peripheral 10 (i.e., communication state, error state, etc.) on the operation panel unit such as a liquid crystal display. The operation display unit 16 further displays, on the operation display panel, the address of a received electronic mail and the telephone number of a sender that is obtained from a caller number notification service (i.e., caller number notification as provided in the ISDN (Integrated Services Digital Network) or a number display as provided in the PSTN (Public Switched Telephone Network)).

The image memory 18 stores image data that is coded by the coding and decoding unit 25 (e.g., coded by use of an MH (modified Huffman) method).

The parameter memory 19 is operated by a battery 13 in the case of emergency. The parameter memory 19 stores parameters used for communication between the multifunction peripheral 10 and a personal computer or the like.

The ROM 22 stores control programs for controlling the multifunction peripheral 10, and also stores a program for correcting plot data that is to be supplied to the plotter 15 according to differences in pixel density. The ROM 22 also stores data of background patterns and barcodes that are added to a print sheet at the time of printing.

The RAM 23 is used as a transmission and reception buffer and as a work area. The RAM 23 also stores data indicative of sender telephone numbers obtained through the caller ID notification service, data indicative of a communication history (including a history of received calls), and data indicative of received electronic mails.

The coding and decoding unit 25 compresses (i.e., encodes) image information at the time of data transmission, and decompresses (i.e., decodes) coded image information to the original data, thereby making it possible to reduce and streamline the time required for electrical transmission of image information.

The CPU 26 executes the control programs stored in the ROM 22 to perform predetermined processing based on various sensor data and instruction data entered through user operations, thereby attending to the overall control of the multifunction peripheral 10 as well as the control of data communication with external devices. The CPU 26 performs the checking, analyzing, and decoding of barcodes and background patterns. The CPU 26 also controls the print operation and the transmission operation with respect to scanned image in response to the management information obtained from a barcode or background pattern of the scanned image.

The communication control unit 27 exchanges facsimile control signals with another multifunction peripheral through a communication line, thereby performing a control procedure. That is, the communication control unit 27 is connected to a public line or dedicated line, and performs tasks such as detection of incoming signals, generation of dialing pulses, switching between voice calls and facsimile transmissions. The communication control unit 27 further detects signals relevant to a sender number notification, transmitting subscriber identification (TSI), called subscriber identification (CSI), and the like obtained from a public network by a caller ID notification service.

Figure 2:
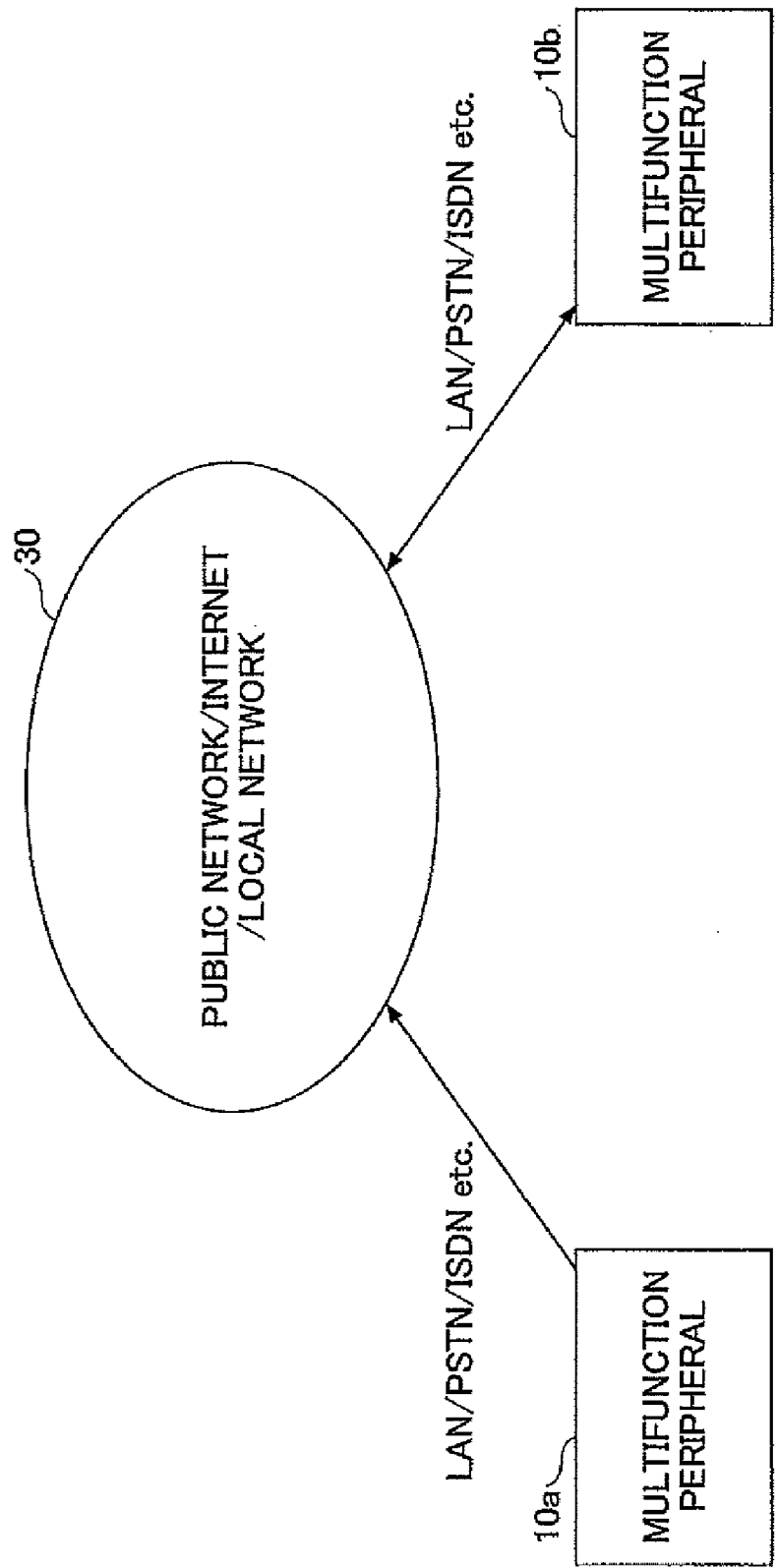
FIG. 2 is a drawing showing an example of the configuration of connections between multifunction peripherals.

FIG. 2 is a drawing showing the configuration of connections of multifunction peripherals 10 according to the present embodiment.

In this example of connections, a multifunction peripheral 10*a* and a multifunction peripheral 10*b* are connected to each other through a network 30.

An image scanned by the multifunction peripheral 10*a* is transmitted to the multifunction peripheral 10*b* at the receiving end by use of fax, electronic mail, or the like through a public network (e.g., PSTN/ISDN), a local network, the Internet, or the like.

In the configuration described above, the multifunction peripheral 10 of the present embodiment can automatically attach a background pattern or barcode at the time of printing data received as print image data from a personal computer, printing data received through facsimile, or printing data received from another multifunction peripheral or the like. The attaching of a background pattern or barcode is performed in response to the identification of a sender who has transmitted the data to be printed. Namely, when data received from a sender specified in a predetermined sender list or the like is to be printed, a background pattern or barcode is automatically attached without user intervention, thereby saving the user the time and effort of making a print setting for attaching a background pattern or barcode to the printed material.

Figure 3:
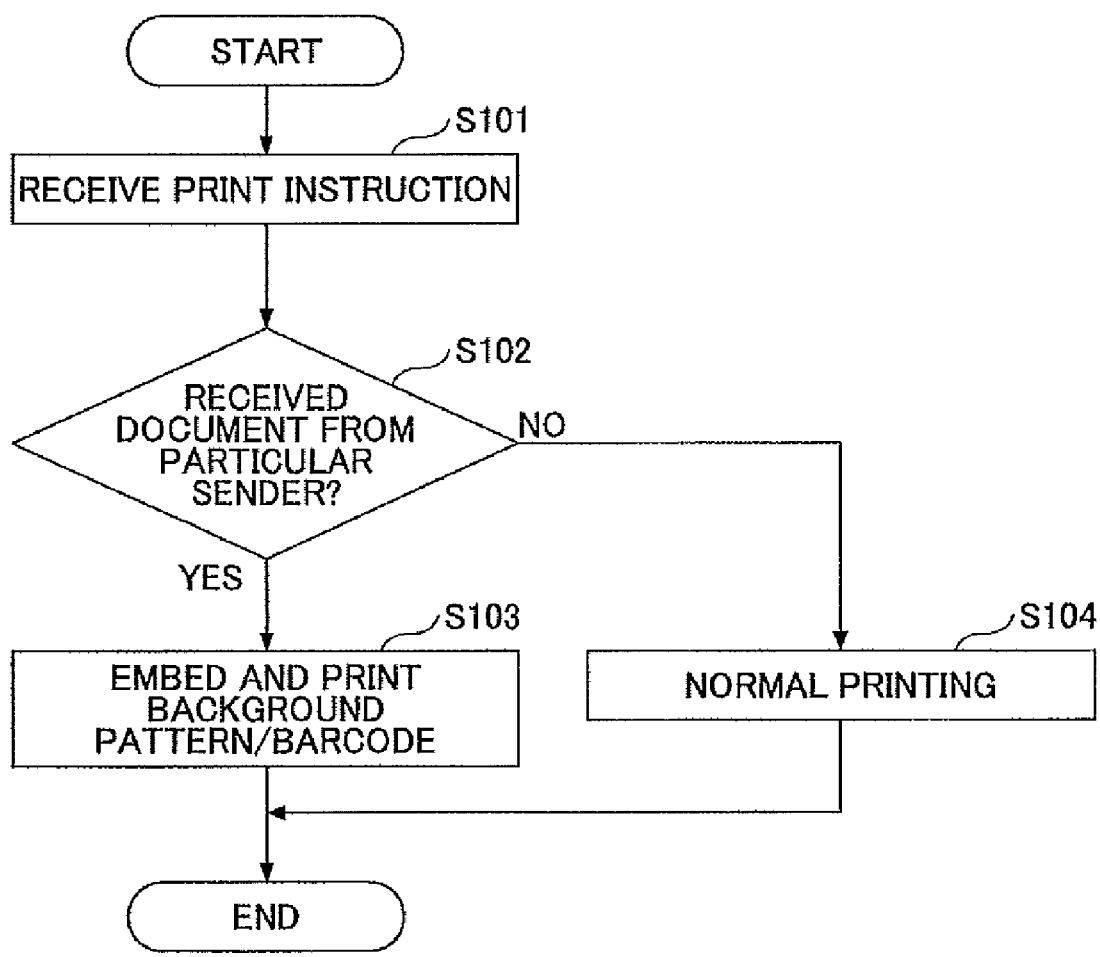
FIG. 3 is a flowchart showing an operation of the multifunction peripheral performed when printing data received from a predetermined sender.

FIG. 3 is a flowchart showing an operation of the multifunction peripheral 10 performed when printing data received from a predetermined sender.

The multifunction peripheral 10 receives a print instruction to print document data (i.e., image data) received through fax (S101). In response, the CPU 26 serving as a sender identification information acquiring unit acquires a telephone number (i.e., facsimile number) of the sender of the document data from the RAM 23. The CPU 26 compares this acquired number with predetermined fax numbers stored in the RAM 23 in advance to check whether the received document data has been supplied from a predetermined sender (S102).

Upon finding that the document data has not been supplied from a predetermined sender (i.e. "NO" in step 102), the CPU 26 performs a normal printing operation, i.e., prints the received document data without attaching a background pattern or barcode (S104).

Upon finding that the document data has been supplied from a predetermined sender (i.e. "YES" in step 102), the received document data is printed together with a background pattern or barcode that is generated in response to instruction by the CPU 26 (S103).

As described above, information such as a background pattern or barcode for inhibiting fax transmission (the term "transmission" includes "transfer") is embedded into a print sheet at the time of printing a document received from a predetermined sender. This arrangement makes it possible to prevent the leakage of information received from a predetermined sender. Management information for inhibiting transmission may be configured such that an attempt to perform the facsimile transmission of an image obtained by scanning a sheet on which image information is printed, together with a background pattern or barcode inclusive of the management information, causes the CPU 26 to issue an alert to the user upon detecting the management information. In response to the displaying of such an alert on the operation display unit 16, for example, the user may operate the operation display unit 16 to confirm his intention to perform the transmission. Only upon such confirmation, the image information may be transmitted. Alternatively, the management information for inhibiting transmission may be transmission prohibiting information such that the CPU 26 does not allow the facsimile transmission upon detecting the management information.

It should be noted that a user may be able to make a setting in advance to specify which one of a barcode and a background pattern is attached in step S103. By the same token, the user may be able make a setting specifying that both a barcode and a background pattern are attached in step S103. When printing data received by electronic mail, the CPU 26 compares in step S102 the electronic mail address of the sender of the electronic mail with predetermined electronic mail addresses stored in the RAM 23 in advance to check whether the received data has been supplied from a predetermined sender.

Information used in determining whether the received document has been supplied from a predetermined sender in step S102 of the above-described procedure may not be limited to a facsimile number and an electronic mail address. Such information may be any information (i.e., sender identification information) that can identify a sender of the data to be printed, and includes an IP (Internet Protocol) address of a personal computer, for example. The sender identification information usable in the present embodiment is not limited to any particular type of information.

Moreover, provision may be made such that the user can make a setting specifying whether a background pattern or barcode is to be embedded (i.e., attached) when the sender identification information is not available (e.g., as in a case in which document data obtained from a recording medium is to be printed).

Further, the multifunction peripheral 10 according to the present embodiment can automatically attach a background pattern or barcode to data received through a particular communication line among a plurality of communication lines if the plurality of communication lines are accommodated (i.e., provided).

Figure 4:
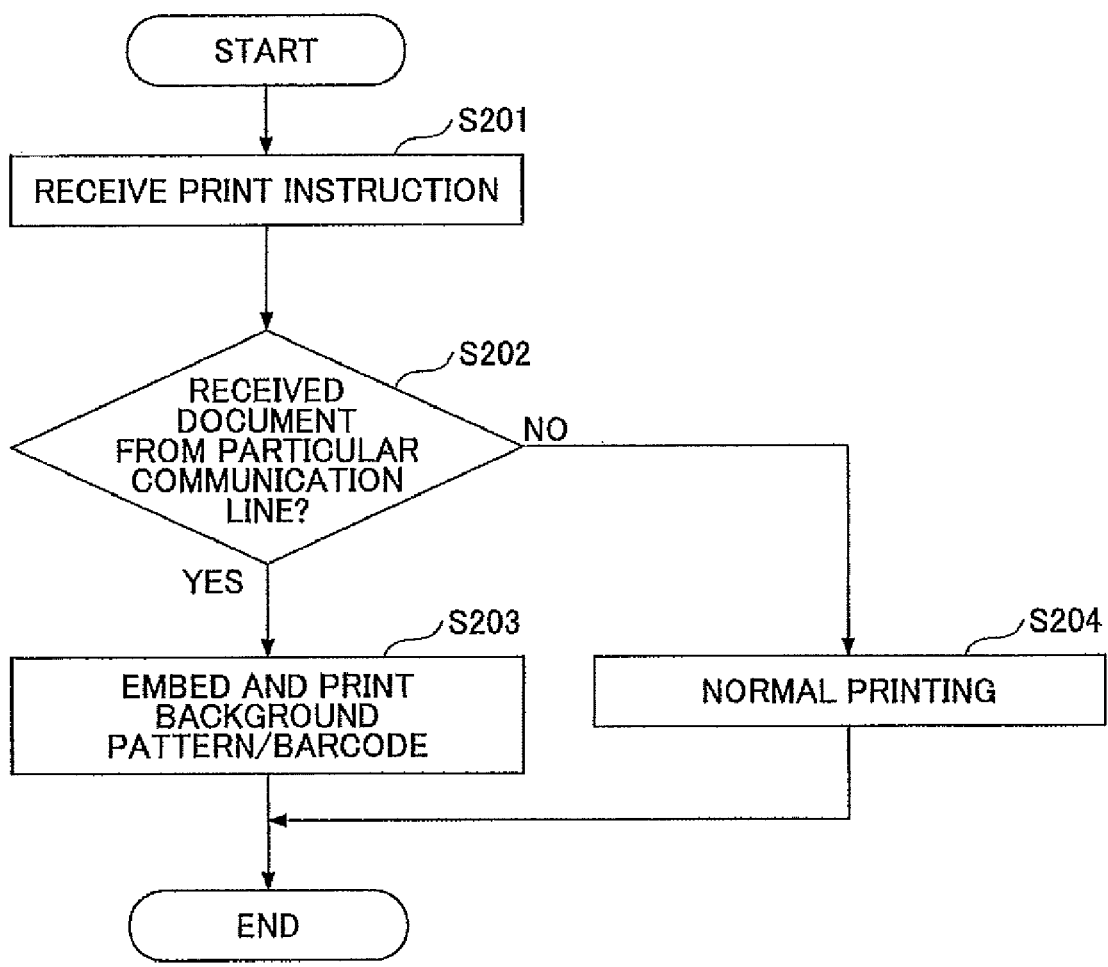
FIG. 4 is a flowchart showing an operation of the multifunction peripheral performed when printing data received through a particular communication line.

FIG. 4 is a flowchart showing an operation of the multifunction peripheral 10 performed when printing data received through a particular communication line.

The multifunction peripheral 10 receives a print instruction to print received document data (S201). In response, the CPU 26 serving as a sender identification information acquiring unit acquires communication line information (e.g., a communication line number) about the communication line through which the document data has been received. The CPU 26 compares this acquired information with predetermined communication line information stored in the RAM 23 in advance to check whether the received document data has been supplied through a predetermined communication line (S202).

Upon finding that the document data has not been supplied through a predetermined communication line (i.e. "NO" in step 202), the CPU 26 performs a normal printing operation, i.e., prints the received document data without modifying the document data (S204).

Upon finding that the document data has been supplied through a predetermined communication line (i.e. "YES" in step 202), the received document data is printed together with a background pattern or barcode that is generated in response to instruction by the CPU 26 (S203).

As described above, transmission inhibition information (including transmission prohibition information) such as a background pattern or barcode for inhibiting transmission is automatically embedded into a print sheet at the time of printing a document received through a predetermined communication line where a plurality of communication lines are provided. This arrangement makes it possible to prevent the leakage of information received through a predetermined communication line.

It should be noted that a user may be able to make a setting in advance to specify which one of a barcode and a background pattern is attached at the time of printing in step S203, as in the case of the flowchart shown in FIG. 3. By the same token, the user may be able make a setting specifying that both a barcode and a background pattern are attached in step S203.

As described above, a background pattern or barcode is automatically attached at the time of printing received document data to prevent the leakage of information. In addition to such an arrangement, a countermeasure can also be taken to alleviate the damage caused by the possible leakage of information if the sender of the document data has a means to know the undesirable use of the document when somebody transmits the printed document through fax or the like.

In this embodiment, sender contact information is printed together with the transmission inhibition information at the time of printing document data when such sender contact information (i.e., information usable for the purpose of contacting the sender such as a communication line number of an electronic mail address) has been received together with the document data.

Figure 5:
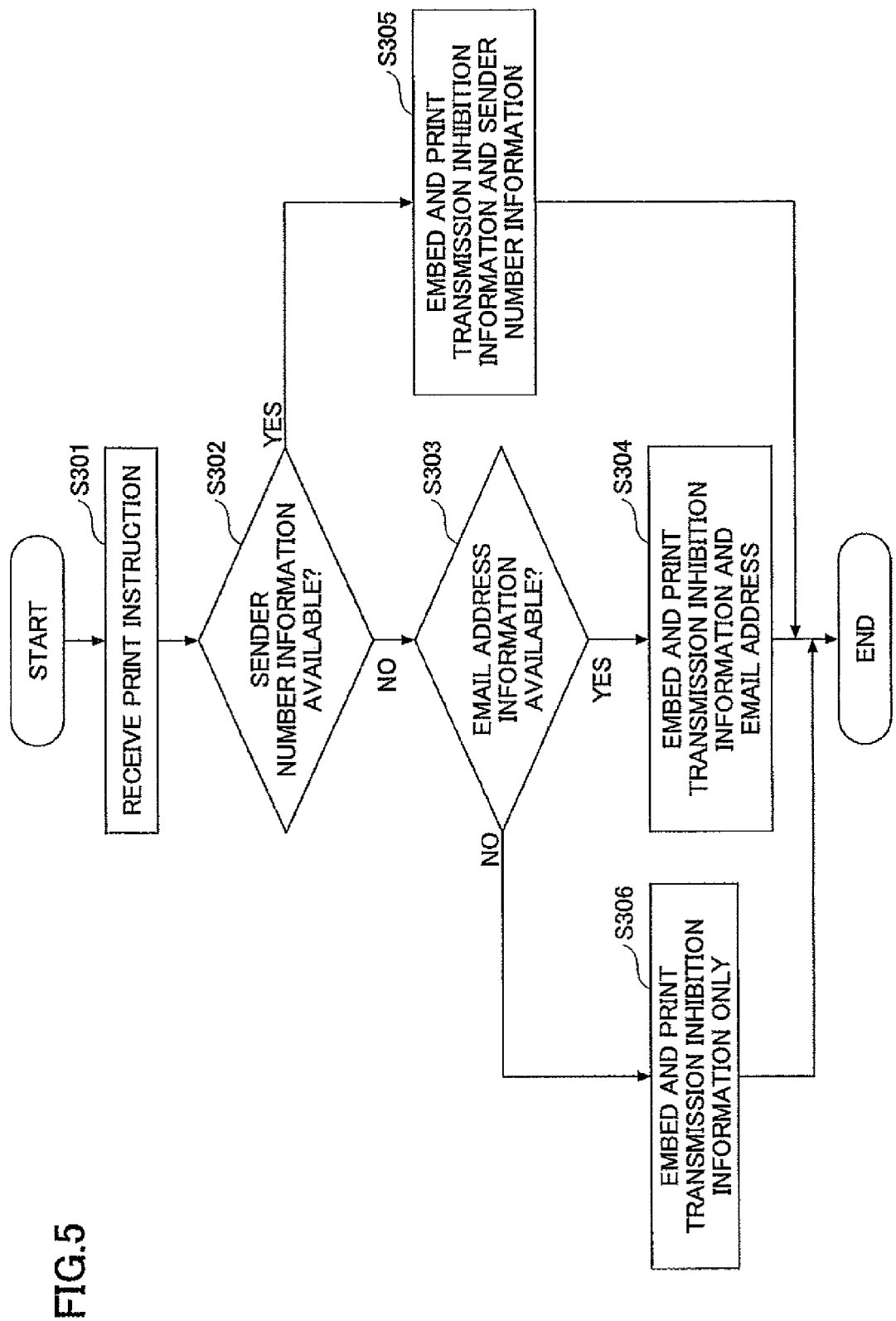
FIG. 5 is a flowchart showing a process of attaching sender contact information to received document data.

FIG. 5 is a flowchart showing a process of attaching sender contact information to received document data.

The multifunction peripheral 10 receives a print instruction to print received document data (S301). A check is made as to whether sender contact information regarding the sender of this document data, e.g., communication line information, has been received (S302). Upon finding that the communication line number of the sender has been received (i.e., "YES" in step S302), the document data is printed together with the transmission inhibition information and the sender communication line number (S305).

Upon finding that the communication line number of the sender has not been received (i.e., "NO" in step S302), a check is made as to whether the electronic mail address of the sender of the document data has been received (S303).

Upon finding that the electronic mail address of the sender has been received (i.e., "YES" in step S303), the document data is printed together with the transmission inhibition information and the electronic mail address of the sender (S304). Upon finding that the electronic mail address of the sender has not been received (i.e., "NO" in step S303), the document data is printed together with only the transmission inhibition information (S306).

In the procedure described above, the sender contact information may be printed together with the document data. When the document data is scanned for the purpose of transmitting the document data, the sender contact information may be detected, so that provision may be made to transmit the document data also to the sender. With this provision, the sender learns that the document is transmitted and that the document has not been properly used. Based on this knowledge, the sender can take a proper countermeasure against the possible leakage of document information. Further, provision may further be made such that the CPU 26 issues an alert to a user by use of the operation display unit 16 upon detecting the management information, and also displays the sender identification on the operation display unit 16. Knowing who the sender is, the user can ascertain the importance of the document and the degree of confidentiality. The user can thus determine whether the transmission of this document is proper.

The above-described embodiments have been directed to an example in which facsimile transmission is used to transmit a scanned image. This is not a limiting example, and the present invention is equally applicable to a case in which a scanned image is transmitted to a remote location as an electronic file. As will be described in subsequent embodiments, the management information that is embedded into a printout as a barcode or background pattern at the time of printing a received document may indicate the presence/absence of copy inhibition, the presence/absence of transmission inhibition, the presence/absence of a "stamp mark" requirement for copy printing, the presence/absence of a "user information mark" requirement for copy printing, etc. Further, the management information may be associated with sender identification information, so that different management information pieces specifying different control operations may be attached to received images supplied from different senders, respectively.

The multifunction peripheral 10 according to the present embodiment may scan sender contact information or transmission inhibition information if the sender contact information or transmission inhibition information is embedded in the document that is scanned for the purpose of making copies, and may embed the scanned sender contact information or transmission inhibition information into a print sheet that is to be used as a copy printout.

Figure 6:
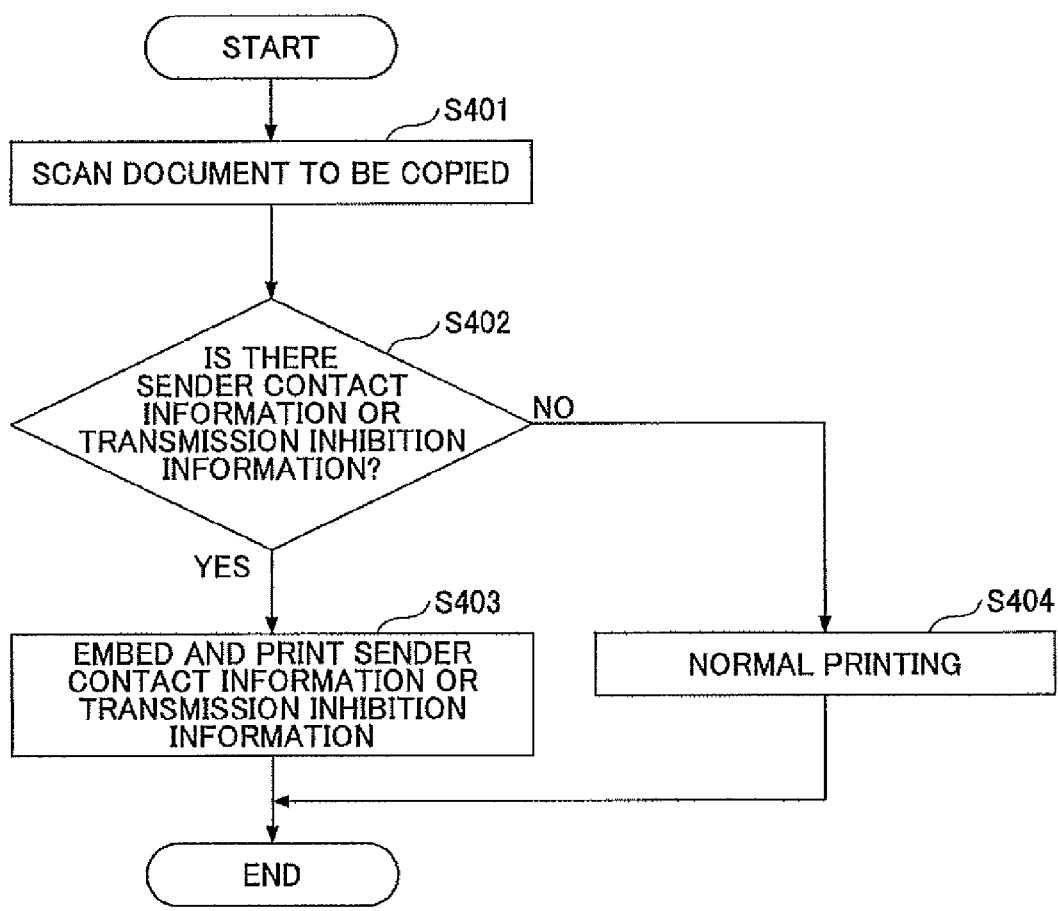
FIG. 6 is a flowchart showing a process of embedding sender contact information or transmission inhibition information into a print sheet that is used as a copy printout.

FIG. 6 is a flowchart showing a process of embedding sender contact information or transmission inhibition information into a print sheet that is used as a copy printout.

The multifunction peripheral 10 uses the scanner 14 to scan a document to be copied (i.e., the original document for making copies) (step S401). A check is made as to whether sender contact information or transmission inhibition information is embedded in the document to be copied (step S402). Namely, a check is made as to whether sender contact information or transmission inhibition information is detected upon scanning the document to be copied.

Upon finding that sender contact information or transmission inhibition information is embedded in the document to be copied (i.e., "YES" in step S402), such sender contact information or transmission inhibition information is printed on and embedded into a print sheet that is used as a copy printout (step S403). Namely, the sender contact information or transmission inhibition information is inherited by the print sheet that is used as a copy printout.

Upon finding that neither sender contact information nor transmission inhibition information is embedded in the document to be copied (i.e., "NO" in step S402), a normal printing operation is performed (step S404).

As described above, sender contact information and/or transmission inhibition information are scanned at the time of scanning a document that includes the sender contact information and/or transmission inhibition information embedded by the procedures shown in FIG. 3 through FIG. 5. Such scanned information can also be embedded into a print sheet that is used as a copy printout, thereby inhibiting the copy printout from being transmitted. This embodiment has been directed to a case in which sender contact information and/or transmission inhibition information are embedded at the time of making a copy. This is not a limiting example, and management information in general may be embedded at the time of making a copy.

Further, a document to be copied may be a copy (i.e., second generation) of the original document (i.e., first generation), or may be a copy (i.e., third generation) of the copy of the original document. The later the generation of the document to be copied, the more likely the document has been copied may times. In the present embodiment, information for inhibiting copying (e.g., barcode containing information for inhibiting copying) may be embedded, in addition to sender contact information and/or transmission inhibition information, into a document that belongs to a later generation than a predetermined generation.

Figure 7:
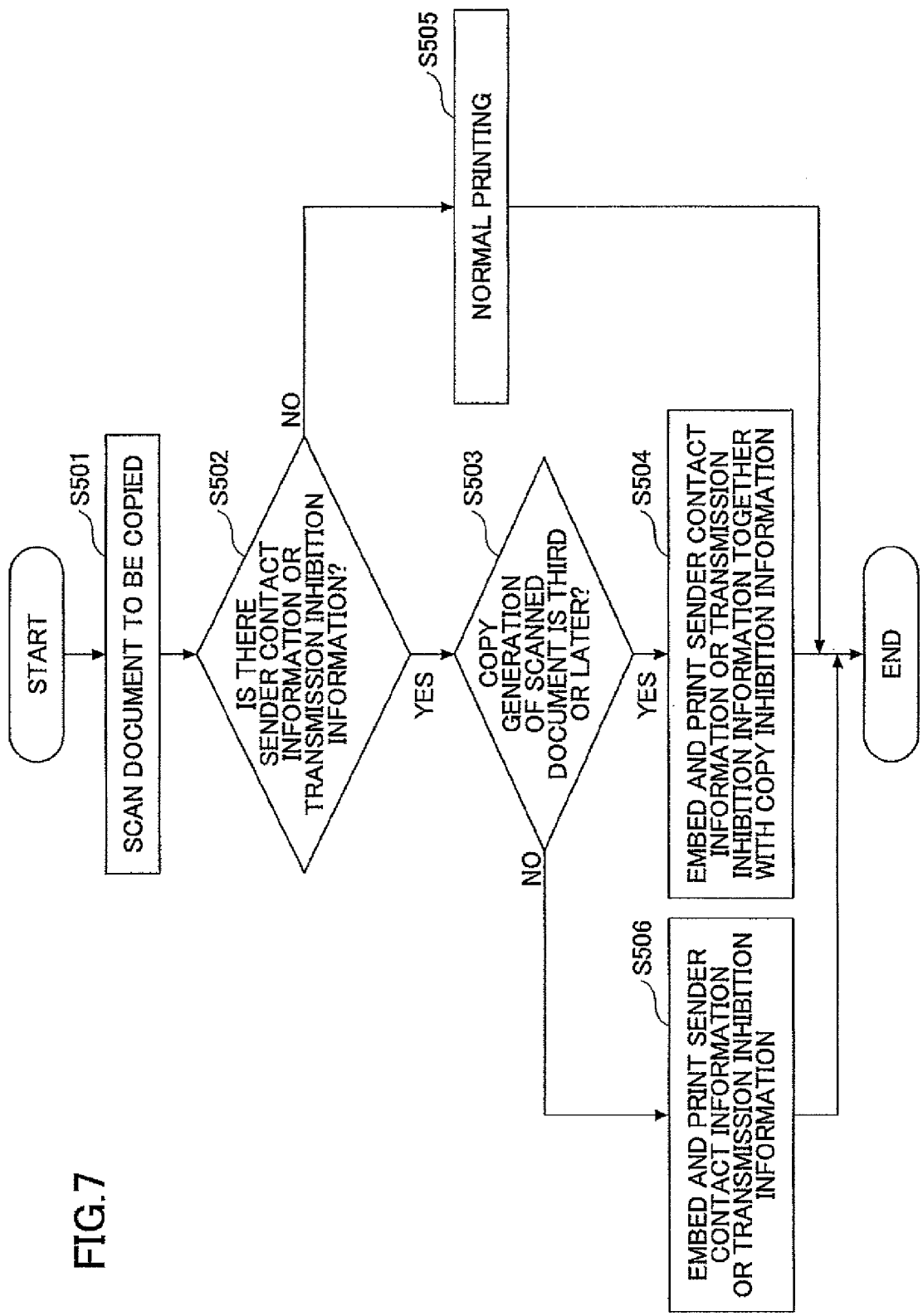
FIG. 7 is a flowchart showing a process of embedding copy inhibition information in response to the generation of a document to be copied.

FIG. 7 is a flowchart showing a process of embedding copy inhibition information in response to the generation of a document to be copied.

The multifunction peripheral 10 uses the scanner 14 to scan a document to be copied (step S501). A check is made as to whether sender contact information or transmission inhibition information is embedded in the document to be copied (step S502). Namely, a check is made as to whether sender contact information or transmission inhibition information is detected upon scanning the document to be copied.

Upon finding that neither sender contact information nor transmission inhibition information is embedded (i.e., "NO" in step S502), a normal printing operation is performed (step S505).

Upon finding that sender contact information or transmission inhibition information is embedded (i.e., "YES" in step S502), a check is made as to whether the scanned document to be copied belongs to a third or later generation.

Upon finding that the document belongs to a first or second generation ("NO" in step S503), the sender contact information and/or transmission inhibition information embedded in the document to be copied is embedded into a print sheet that is used as a copy printout (S506).

Upon finding that the document belongs to a third or later generation (i.e., "YES" in step S503), the sender contact information and/or transmission inhibition information is printed and embedded together with copy inhibition information generated in response to instruction from the CPU 26 (step S504).

As described above, the copy inhibition information (including copy prohibition information) is embedded in addition to the sender contact information and/or transmission inhibition information with respect to a document that belongs to a generation later than a predetermined generation, thereby making it possible to improve the security of information.

The check of the generation of the scanned document in step S503 may be performed by utilizing a method disclosed in Japanese Patent Application Publication No. 2007-221222, for example, in which a barcode or the like containing generation information is attached to a document to be copied and is scanned to determine the generation. Further, the predetermined generation that is used as a criteria for the check made in step S503 may be modified in response to a user setting or the like.

Figure 8:
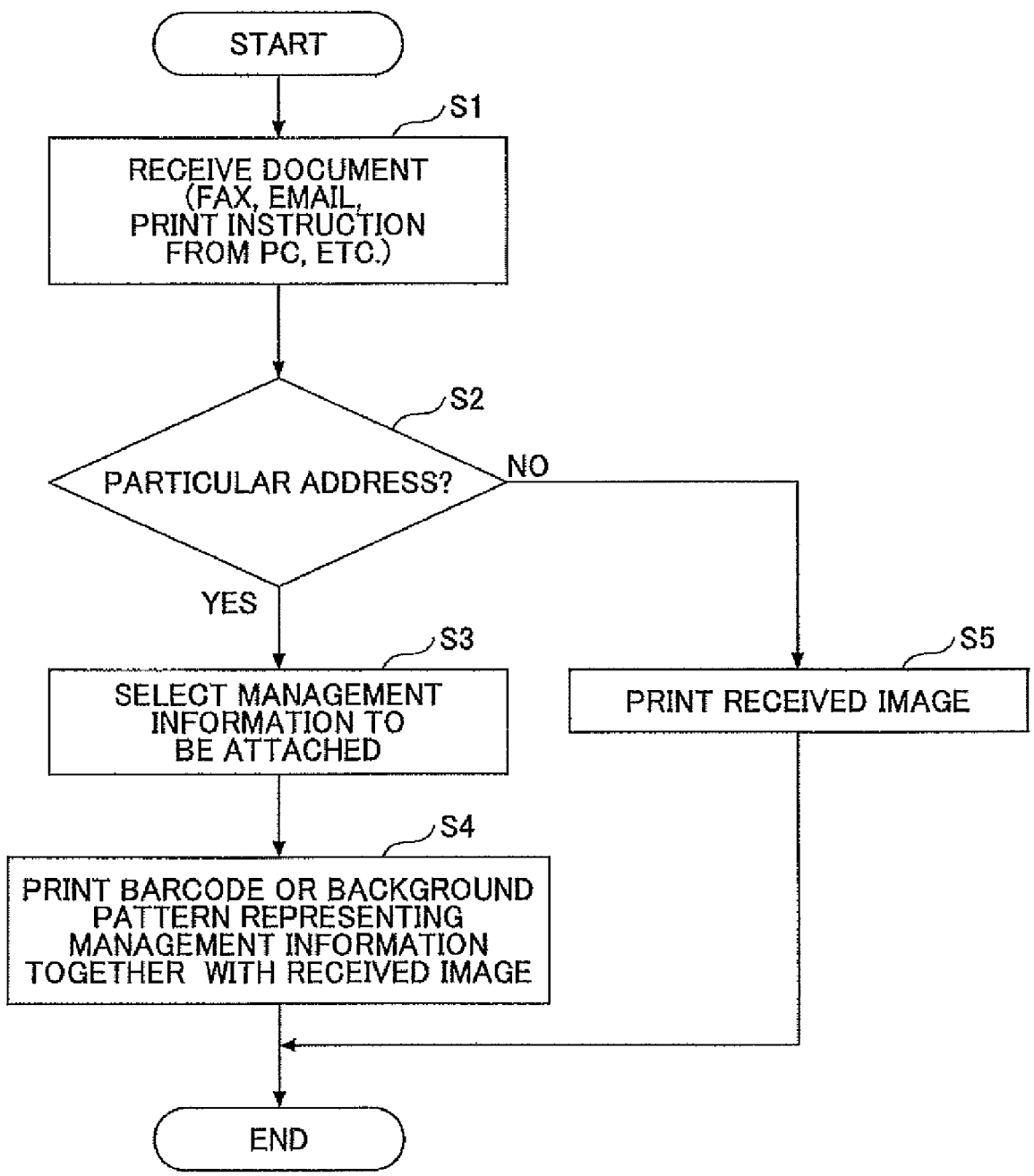
FIG. 8 is a flowchart showing a general operation of the multifunction peripheral performed upon receiving a document.

FIG. 8 is a flowchart showing a general operation of the multifunction peripheral 10 performed upon receiving a document.

In step S1, the multifunction peripheral 10 receives print image data through electronic mail via the network control unit 21, print image data from a personal computer via the network control unit 21, or print image data through facsimile via the switched-network control unit 28. In step S2, the CPU 26 of the multifunction peripheral 10 checks whether the sender having supplied the above-noted print image data corresponds to a particular address. Upon finding in step S2 that the sender corresponds to a particular address, the CPU 26 selects management information to be attached in step S3. Several types of management information are defined, including "copy inhibition," "stamp marking," "user information marking," "transmission inhibition," and the like. The CPU 26 may select management information of a particular type that is assigned to the sender address. For example, a sender address A may be assigned to the management information indicative of "copy inhibition", and a sender address B may be assigned to the management information indicative of "transmission inhibition". In such a case, the management information "copy inhibition" is selected in response to the receipt of image data from the sender address A.

In step S4, the CPU 26 uses the plotter 15 to print on a print medium (i.e., print sheet) the received image and a background pattern (or barcode) generated by encoding the selected management information. Upon finding in step S2 that the sender does not correspond to a particular address, the CPU 26 uses the plotter 15 in step S5 to print only the received image on a print medium (i.e., print sheet). With this, the procedure for the receipt of image data comes to an end.

Figure 9:
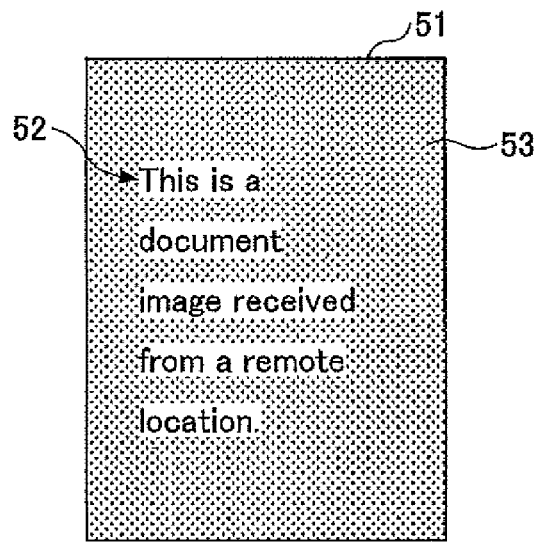
FIG. 9 is an illustrative drawing showing an example of a background pattern printed together with a received image in an overlapping manner.

FIG. 9 is an illustrative drawing showing an example of a background pattern printed together with a received image in an overlapping manner. As shown in FIG. 9, a background pattern 53 obtained by encoding management information is printed on a print medium 51 together with a received image (print document) 52 in an overlapping fashion. The dot pattern of the background pattern 53 corresponds to a bit sequence comprised of "1"s and "0"s representing the selected management information.

Figure 10:
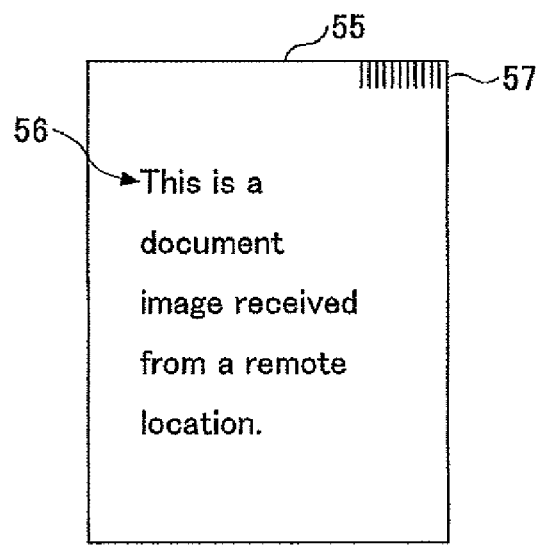
FIG. 10 is an illustrative drawing showing an example of a barcode printed together with a received image.

FIG. 10 is an illustrative drawing showing an example of a barcode printed together with a received image. As shown in FIG. 10, a barcode 57 obtained by encoding management information is printed at a predetermined location on a print medium 55 together with a received image (print document) 56. The bar and space pattern of the barcode 57 corresponds to a bit sequence comprised of "1"s and "0"s representing the selected management information.

FIG. 11 is a drawing showing an example of an address table used in a check operation for checking whether a sender corresponds to a particular address. An address table 61 shown in FIG. 11 includes data entries for each sender, such data entries including a name (i.e., individual name or company name), a sender address, a background pattern, and a flag indicative of whether sender information is to be embedded. An address book that is originally provided in the multifunction peripheral 10 as default may be utilized as the address table 61.

The second entry, for example, has the company name "company B", the sender address "05-XXX-XXXX" that is a facsimile number, a background pattern that is to be printed together with a received image and represents the management information indicative of the requirement to place a stamp mark, and the flag "ON" indicative of the need to embed sender information. Upon receiving image data (e.g., document data) via fax in step S1, the CPU 26 searches for its sender address in the address table 61. The CPU 26 may find that the fax telephone number "05-XXX-XXXX" of the second entry corresponds to the sender address. In this case, thus, it is found that the sender address corresponds to a particular address (i.e., predetermined address) as described in connection with step S2 of FIG. 8. In response to the detection of such correspondence (i.e., address match), the CPU 26 controls the plotter 15 to print the background pattern of the second entry indicative of the need to print a stamp mark, together with the received image on a print medium. The sender addresses may specify not only telephone numbers but also electronic mail addresses such as "XXX@mail.cc" and IP addresses such as "101.XXX.XXX.XXX".

The types of management information to be contained in a background (or barcode) include "copy prohibition," "stamp marking," "user information marking," and "transmission prohibition". The management information "copy prohibition" requires that a copy operation be not performable when an attempt is made to scan and make a copy of a printout (i.e., print sheet) having a relevant background pattern (or barcode) printed thereon by use of the scanner 14 and the plotter 15. The management information "stamp marking" requires that a stamp mark such as "Confidential" or "For Internal Use Only" be printed on a copy printout when a printout having a relevant background pattern (or barcode) printed thereon is scanned and copied by use of the scanner 14 and the plotter 15. The management information "user information marking" requires that explicit information (i.e., visually readable information) indicative of the sender such as a name (e.g., "company B") be printed on the header portion or the like of a copy printout when a printout having a relevant background pattern (or barcode) printed thereon is scanned and copied by use of the scanner 14 and the plotter 15. The management information "transmission prohibition" requires that a transmission operation be not performable or be performed only upon issuing an alert and receiving confirmation for transmission when an attempt is made to scan and transmit a printout having a relevant background pattern (or barcode) printed thereon by use of the scanner 14 and the network control unit 21 or switched-network control unit 28. For a received image that is supplied from a sender corresponding to an entry having the background pattern setting "OFF" in the address table 61, no background pattern (or barcode) is printed.

The flag included in the address table 61 specifies whether there is a need to embed sender information. Information indicative of the sender is embedded in the same manner as in the case described by referring to FIG. 5 if a received image is supplied from a sender corresponding to an entry having the flag 'ON'. Namely, a background (or barcode) obtained by encoding information about the sender is printed on a print medium together with the received image.

Figure 12:
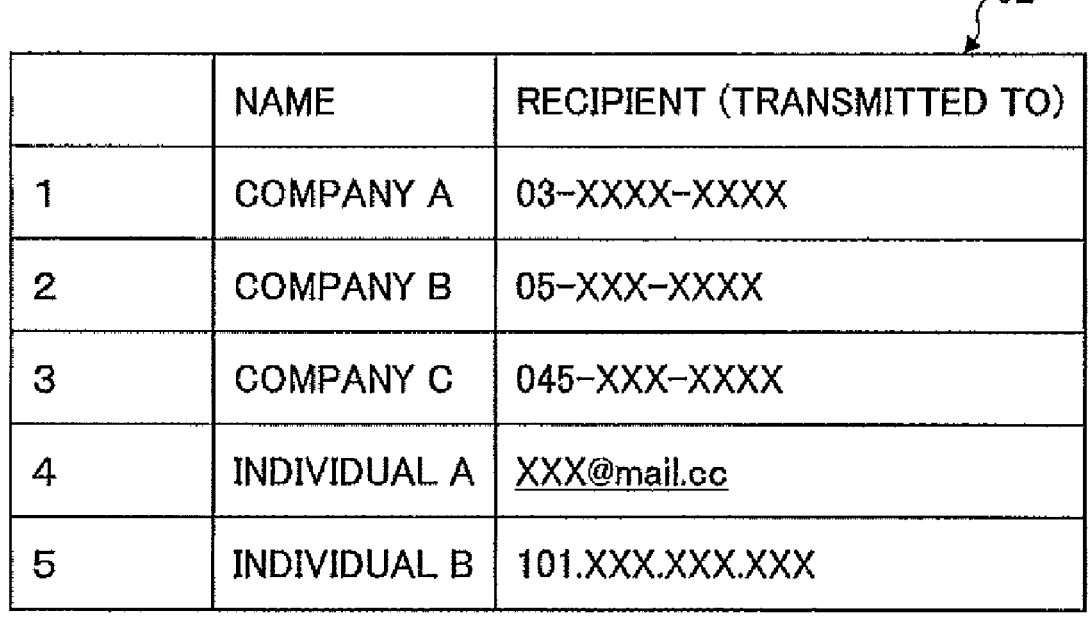
FIG. 12 is a drawing showing another example of an address table used in a check operation for checking whether a sender corresponds to a particular address.

FIG. 12 is a drawing showing another example of an address table used in a check operation for checking whether a sender corresponds to a particular address. An address table 62 shown in FIG. 12 contains data which specify a name (i.e., individual name or company name) and a sender address for each table entry. A transmission address book that is originally provided in the multifunction peripheral 10 as default may be utilized as the address table 62. The transmission address book is an address book that is used to send electronic data to outside the multifunction peripheral 10.

Upon receiving image data (e.g., document data) in step S1, the CPU 26 searches for its sender address in the address table 62. The CPU 26 may find that the fax telephone number "05-XXX-XXXX" of the second entry corresponds to the sender address. In response to the detection of such correspondence (i.e., address match), the CPU 26 controls the plotter 15 to print a background pattern obtained by encoding predetermined management information (e.g., "transmission prohibition") together with the received image on a print medium. With this arrangement, it is possible to perform strict security management such as transmission prohibition with respect to the predetermined senders registered in the multifunction peripheral 10 (i.e., the senders listed in the transmission address table 62).

The description provided above has been directed to an example in which an address table is used to determine whether a sender address corresponds to a particular address. Instead of using an address table, a determination as to whether a sender belongs to a particular address (i.e., an address for which a background pattern or barcode is to be printed) may be made by referring to the type of a communication means through which the received image data has been supplied. Criteria for the determination may be such that in the case of fax reception, the fax number of the sender is regarded as a particular address whereas in the case of email reception, the email address of the sender is not regarded as a particular address, for example. In this case, a background pattern or barcode is printed in the case of fax reception, and is not printed in the case of email reception.

Figure 13:
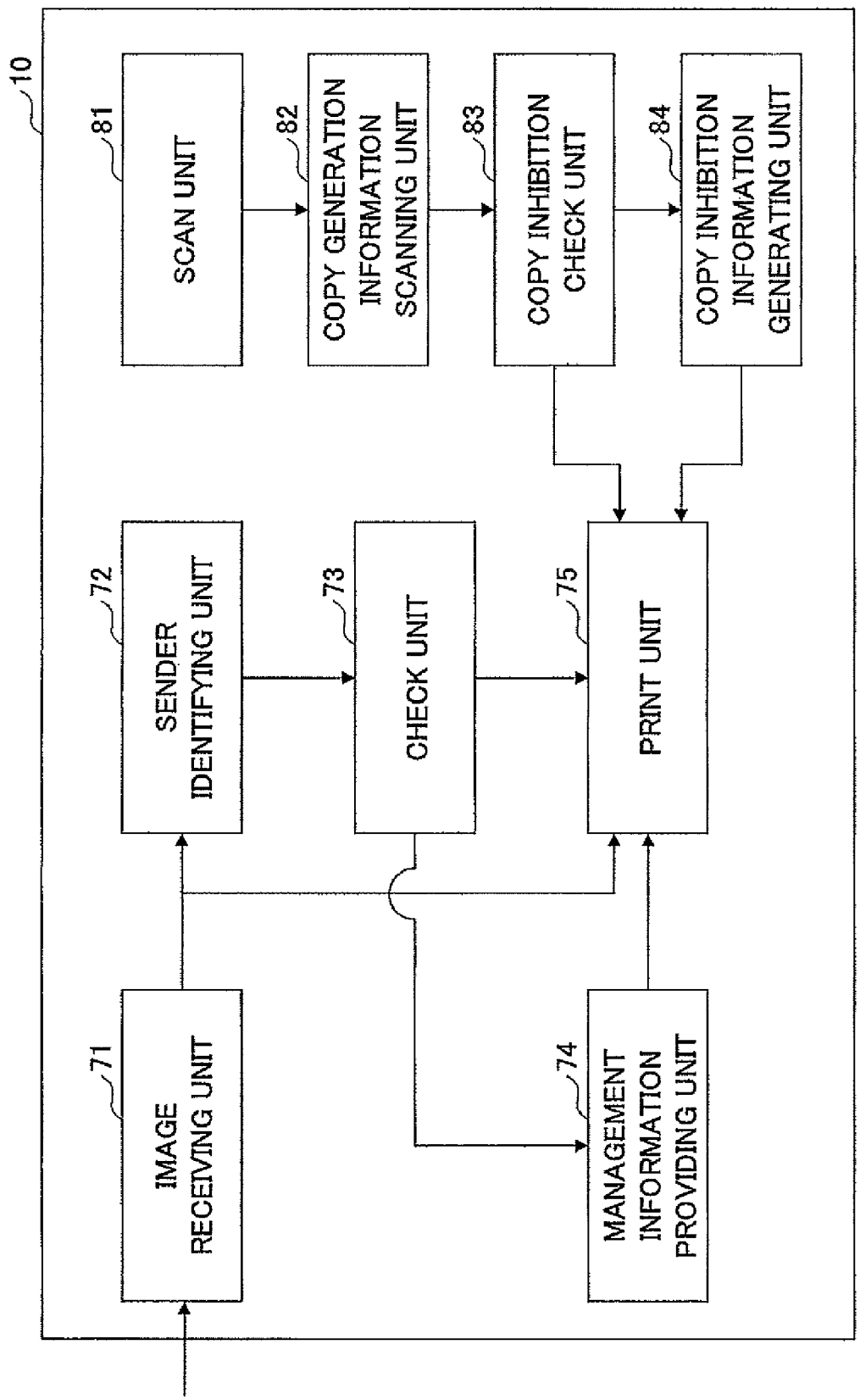
FIG. 13 is a drawing showing an example of the functional block configuration of the multifunction peripheral.

FIG. 13 is a drawing showing an example of the functional block configuration of the multifunction peripheral 10. The functions of these blocks are implemented by the operations of the scanner 14, the plotter 15, the ROM 22, the RAM 22, the image memory 18, the network control unit 21, the switched-network control unit 28, and the like working under the control of the CPU 26 of the multifunction peripheral 10.

An image receiving unit 71 receives image data through a network or a telephone line. A sender identifying unit 72 identifies a sender of the image data received by the image receiving unit 71. Namely, the sender identifying unit 72 identifies the fax telephone number of the sender, the electronic mail address of the sender, the IP address of an apparatus such as a personal computer of the sender, or the like. A check unit 73 checks whether the sender identified by the sender identifying unit 72 corresponds to a predetermined sender (i.e., a particular address for which a background pattern or barcode is to be printed). A management information providing unit 74 provides management-purpose image data obtained by encoding management information for controlling at least one of a transmission operation for transmitting an image scanned from a printout and a copy operation for copying an image scanned from a printout. For example, the management information providing unit 74 generates the image data of a background pattern or a barcode created by coding management information. A print unit 75 prints the management-purpose image data supplied from the management information providing unit 74 together with the received image data supplied from the image receiving unit 71 in response to instruction from the check unit 73. It should be noted that the management-purpose image data is printed only when the check unit 73 ascertains that the identified sender corresponds to a predetermined sender.

In the multifunction peripheral 10 shown in FIG. 13, a copy generation information scanning unit 82 extracts copy generation information from the printed image scanned by a scan unit 81. A copy inhibition check unit 83 checks whether copy inhibition information is to be printed on a print medium, based on the copy generation information extracted from the printed image. A copy inhibition information generating unit 84 generates information (coded instruction) for inhibiting the copying of the printed image based on the check results made by the copy inhibition check unit 83. These units work together to implement the operation described in connection with the flowchart shown in FIG. 7.

In order to perform the procedures described in accordance with the flowcharts described heretofore, programs describing these procedures are loaded to a computer (i.e., multifunction peripheral). Such computer programs may be recorded in a computer-readable recording medium such as a HDD (hard-disk drive), a CD (compact disk), an FD (flexible disk), an MO (magneto-optical disk), or the like, and may be installed in the computer.

The operations (especially check operations) performed in these procedures are performed by the CPU 26 executing the programs.

Furthers the present invention is not limited to these embodiments, but various variations and modifications may be made without departing from the scope of the present invention.

The present application is based on Japanese priority applications No. 2007-329389 filed on Dec. 20, 2007, and No. 2008-287957 filed on Nov. 10, 2008, with the Japanese Patent Office, the entire contents of which are hereby incorporated by reference.

What is claimed is:

1. An image forming apparatus, comprising:
   an image receiving unit configured to receive image data from a device which is connected to the image forming apparatus through a communication network;
   a sender identifying unit configured to identify information of a sender of the received image data;
   a management information storing unit configured to store management information for controlling at least one of a transmission operation for transmitting an image scanned from a printout and a copy operation for copying the image scanned from the printout;
   a determining information storing unit configured to store a plurality of pieces of determining information to determine whether the management information is attached to the image data received from the sender, each piece of the determining information corresponding to each of a plurality of pieces of information of senders;
   a determining unit configured to determine whether the management information is attached to the image data based on the determining information corresponding to the information of sender identified by the sender identifying unit; and
   an outputting unit configured to output the image data to which the management information is attached when the determining unit determines that the management information is attached to the image data.

2. The image forming apparatus as claimed in claim 1, wherein the determining unit includes address data listing user addresses, and is configured to determine that the identified sender corresponds to a predetermined sender upon finding that the identified sender is indicated in the address data as a sender for which management information is to be attached.

3. The image forming apparatus as claimed in claim 2, wherein the addresses and management information indications are associated with each other in the address data, and the management information indications are different for at least two of the addresses, wherein the management information storing unit is configured to provide the management information in response to the management information indication corresponding to the identified sender in the address data.

4. The image forming apparatus as claimed in claim 1, wherein the determining unit includes address data listing user addresses for transmission, and is configured to determine that the identified sender corresponds to a predetermined sender upon finding that the identified sender is included in the address data.

5. The image forming apparatus as claimed in claim 1, wherein the management information indicates at least one of prohibition of transmitting an image scanned from a printout, prohibition of copying an image scanned from a printout, a requirement to print a stamp mark when copying an image scanned from a printout, and a requirement to print user information when copying an image scanned from a printout.

6. The image forming apparatus as claimed in claim 1, wherein the determining unit is configured to determine that the identified sender corresponds to a predetermined sender in response to a type of a communication means through which the received image data has been supplied.

7. The image forming apparatus as claimed in claim 1, wherein the management information represented by the printed management-purpose image data is at least one of transmission inhibition information and sender contact information.

8. The image forming apparatus as claimed in claim 1, further comprising a scan unit configured to scan printed images of the received image data and the management information printed by the outputting unit on a first print medium, wherein the outputting unit is configured to print on a second print medium the received image data and the management information scanned by the scan unit.

9. The image forming apparatus as claimed in claim 1, further comprising:
a scan unit configured to scan copy generation information of a printed image;
a copy inhibition information generating unit configured to generate copy inhibition information for inhibiting copying of the printed image;
a copy inhibition check unit configured to check whether the copy inhibition information is to be printed on a print medium, based on the copy generation information scanned from the printed image; and
a unit configured to print the copy inhibition information on a print medium based on a check result made by the copy inhibition cheek unit.

10. An image forming method, comprising the steps of:
receiving image data from a device which is connected to the image forming apparatus through a communication network;
identifying information of a sender of the received image data;
storing management information for controlling at least one of a transmission operation for transmitting an image scanned from a printout and a copy operation for copying the image scanned from the printout;
storing a plurality of pieces of determining information to determine whether the management information is attached to the image data received from the sender, each piece of the determining information corresponding to each of a plurality of pieces of information of senders;
determining whether the management information is attached to the image data based on the determining information corresponding to the information of sender identified by the sender identifying step; and
outputting the image data to which the management information is attached when the determining step determines that the management information is attached to the image data.

11. The image forming method as claimed in claim 10, wherein the step of determining determines whether the identified sender corresponds to a predetermined sender by referring to address data listing user addresses.

12. The image forming method as claimed in claim 10, further comprising the steps of
scanning printed images of the received image data and the management information printed on a first print medium; and
printing on a second print medium the received image data and the management information scanned by the step of scanning the printed images.

13. The image forming method as claimed in claim 10, further comprising:
scanning copy generation information of a printed image;
generating copy inhibition information for inhibiting copying of the printed image;
checking whether the copy inhibition information is to be printed on a print medium, based on the copy generation information scanned from the printed image; and
printing the copy inhibition information on a print medium based on a cheek result made by the above step of checking.

14. A non-transitory computer-readable recording medium having a memory device and a program embodied therein for causing a computer to perform the steps of:
receiving image data from a device which is connected to the image forming apparatus through a communication network;
identifying information a sender of the received image data;
storing management information for controlling at least one of a transmission operation for transmitting an image scanned from a printout and a copy operation for copying the image scanned from the printout;
storing a plurality of pieces of determining information to determine whether the management information is attached to the image data received from the sender, each piece of the determining information corresponding to each of a plurality of pieces of information of senders;
determining whether the management information is attached to the image data based on the determining information corresponding to the information of sender identified by the sender identifying step; and
outputting the image data to which the management information is attached when the determining unit determines that the management information is attached to the image data.

* * * * *